United States Patent [19]
Ikebe

[11] Patent Number: 6,061,547
[45] Date of Patent: *May 9, 2000

[54] TRANSMITTING APPARATUS FOR USE IN NON-GEOSTATIONARY SATELLITES

[75] Inventor: Kenichi Ikebe, Tokyo, Japan

[73] Assignee: NEC Corporation, Japan

[ * ] Notice: This patent is subject to a terminal disclaimer.

[21] Appl. No.: 09/116,347

[22] Filed: Jul. 15, 1998

Related U.S. Application Data

[63] Continuation of application No. 08/550,919, Oct. 31, 1995.

[30] Foreign Application Priority Data

Oct. 31, 1994 [JP] Japan ............................. 6-267245

[51] Int. Cl.$^7$ ..................................... H04B 7/185
[52] U.S. Cl. ..................... 455/12.1; 455/13.1; 455/13.4; 244/171; 342/354
[58] Field of Search ................. 455/12.1, 13.1, 455/13.2, 13.3, 13.4, 25, 69, 11.1, 427, 428; 342/352, 353, 354; 244/171, 176, 195; 370/316, 318

[56] References Cited

U.S. PATENT DOCUMENTS

| | | | |
|---|---|---|---|
| 5,184,139 | 2/1993 | Hirako et al. | 342/354 |
| 5,390,338 | 2/1995 | Bodin et al. | 455/69 |
| 5,845,193 | 12/1998 | Ikebe | 455/12.1 |

FOREIGN PATENT DOCUMENTS

| | | |
|---|---|---|
| 60-71399 | 4/1985 | Japan . |
| 2-84827 | 3/1990 | Japan . |

OTHER PUBLICATIONS

Y. Wakabayashi, et al., "Research and Development of Precision Earth Sensor", SPIE—The International Society for Optical Engineering, vol. 1157, Aug. 7–9, 1989, Reprinted from Infrared Technology XV, pp. 299–308.

*Primary Examiner*—Wellington Chin
*Assistant Examiner*—Lee Nguyen
*Attorney, Agent, or Firm*—Ostrolenk, Faber, Gerb & Soffen, LLP

[57] ABSTRACT

A transmitting apparatus for use in non-geostationary satellites which allows compliance with the restrictions placed on PFD even when the Earth is located between the geostationary satellite and the non-geostationary satellite. The transmitting apparatus 10 for use in non-geostationary satellites having a transmitting section 16 which sends a transmitting signal to the geostationary satellite, comprises an Earth-sensing section 19 for detecting the presence of the Earth in the direction of transmission and a transmission direction-shifting section 20 for shifting the direction of transmission of the transmitting signal in response to detection of the Earth-sensing section 19 to prevent the Earth from being exposed to the transmitting signal. Instead of the transmission direction-shifting section 20, there may be used a power supply-suspending section which automatically suspends power supply to the transmitting section 16 thereby stopping transmission of the transmitting signal.

8 Claims, 3 Drawing Sheets

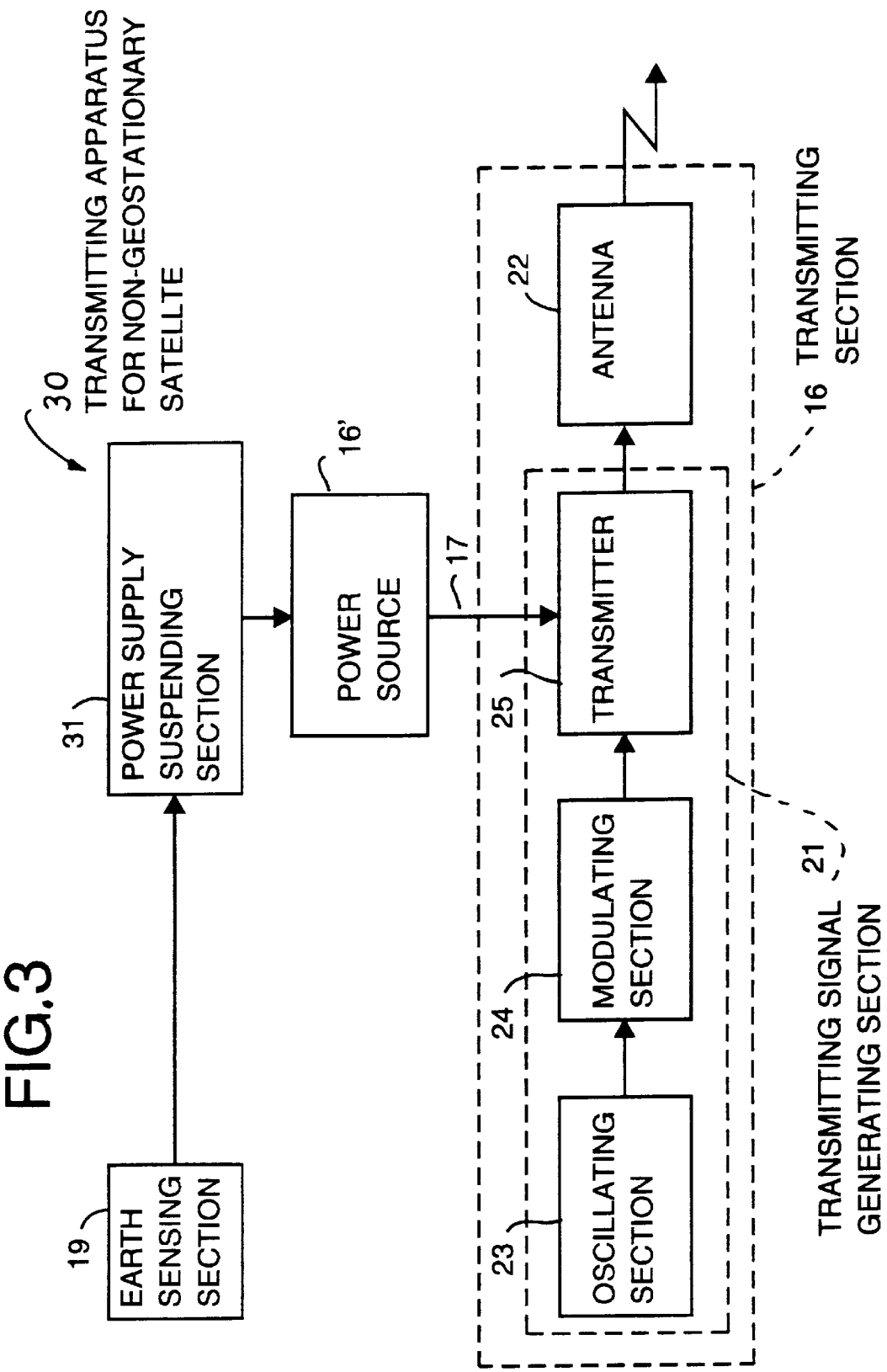

6,061,547

TRANSMITTING APPARATUS FOR USE IN NON-GEOSTATIONARY SATELLITES

This is a Continuation of application Ser. No. 08/550,919, filed Oct. 31, 1995.

BACKGROUND OF THE INVENTION

1. Field of the Invention

The present invention relates to a transmitting apparatus for use in non-geostationary satellites, which is mounted in a non-geostationary satellite of a satellite communications system to carry out intersatellite communication between a geostationary satellite and the non-geostationary satellite (revolving satellite).

2. Description of the Prior Art

A transmitting apparatus of this type for non-geostationary satellites is mounted in a non-geostationary satellite of a satellite communications system to carry out intersatellite communication between a geostationary satellite revolving around the Earth along a geostationary orbit separated from the surface of the Earth by a first given distance in a stationary state relative to the surface of the Earth, and the non-geostationary satellite revolving around the Earth along a non-geostationary orbit separated from the surface of the Earth by a second given distance smaller than the first given distance in a non-stationary state relative to the surface of the Earth (in other words, in a state of motion relative to the surface of the Earth).

Such a transmitting apparatus for non-geostationary satellites is usually equipped with a transmitting section which is supplied with power and sends signals to a geostationary satellite along the path between the non-geostationary satellite and the geostationary satellite.

In the case of a non-geostationary satellite intended for intersatellite communication with a geostationary satellite, in order for the non-geostationary satellite moving near the surface of the Earth to communicate with the geostationary satellite in a geostationary orbit, it becomes necessary to send a signal with a higher power flux density (PFD) from the non-geostationary satellite to the geostationary satellite than for communication between the non-geostationary satellite and an Earth station. As the Earth approaches the path between the geostationary satellite and the non-geostationary satellite, however, the Earth is exposed to the signal with the higher PFD, which is not compliant with the restrictions on the PFD prescribed by the Radio Law.

SUMMARY OF THE INVENTION

Therefore, it an object of the present invention to provide a transmitting apparatus for use in non-geostationary satellites which allows compliance with the restrictions placed on PFD even in when the Earth is located between the geostationary satellite and the non-geostationary satellite.

According to the present invention, there is provided a transmitting apparatus for use in non-geostationary satellites which is mounted in a non-geostationary satellite of a satellite communications system to carry out intersatellite communication between a geostationary satellite revolving around the Earth along a geostationary orbit separated from the surface of the Earth by a first given distance in a stationary state relative to the surface of the Earth, and the non-geostationary satellite revolving around the Earth along a non-geostationary orbit separated from the surface of the Earth by a second given distance smaller than the first given distance in a non-stationary state relative to the surface of the Earth, and which is equipped with transmitting means which sends a transmitting signal to the geostationary satellite along the path between the non-geostationary satellite and the geostationary satellite, characterized by comprising:

Earth-sensing means for detecting the presence of the Earth in the direction of transmission of the transmitting signal by the transmitting means to output a detection signal as long as the Earth crosses the direction of transmission of the transmitting signal; and transmission direction-shifting means which is connected to the transmitting means and the Earth-sensing means and is designed to shift the direction of transmission of the transmitting signal by the transmitting means to a direction which prevents the Earth from being exposed to the transmitting signal (an Earth-bypassing direction) as long as the transmission direction-shifting means is receiving the detection signal.

According to the present invention, there is also provided a modification of the above transmitting apparatus for use in non-geostationary satellites wherein the transmitting means comprises a transmitting signal-generating section which generates the transmitting signal and an antenna which is connected to the transmitting signal-generating section to send the transmitting signal to a geostationary satellite along the path between the non-geostationary satellite and the geostationary satellite, characterized in that the transmission direction-shifting means is connected to the Earth-sensing means and the antenna and is designed to shift the direction of transmission of the transmitting signal by the transmitting means to an Earth-bypassing direction as long as the transmission direction-shifting means is receiving the detection signal.

According to the present invention, there is provided another modification of the transmitting apparatus for use in non-geostationary satellites which is mounted in a non-geostationary satellite of a satellite communications system to carry out intersatellite communication between a geostationary satellite revolving around the Earth along a geostationary orbit separated from the surface of the Earth by a first given distance in a stationary state relative to the surface of the Earth, and the non-geostationary satellite revolving around the Earth along a non-geostationary orbit separated from the surface of the Earth by a second given distance smaller than the first given distance in a non-stationary state relative to the surface of the Earth, and which is supplied with power and is equipped with transmitting means which sends a transmitting signal to the geostationary satellite along the path between the non-geostationary satellite and the geostationary satellite, characterized by comprising:

Earth-sensing means for detecting the presence of the Earth in the direction of transmission of the transmitting signal by the transmitting means to output a detection signal as long as the Earth crosses the direction of transmission of the transmitting signal; and power supply-suspending means which is connected to the transmitting means and the Earth-sensing means and is designed to automatically suspend supply of the power to the transmitting means thereby stopping transmission of the transmitting signal by the transmitting means as long as the power supply-suspending means is receiving the detection signal.

BRIEF DESCRIPTION OF THE DRAWINGS

Other objects, features and advantages of the present invention will become more apparent when the following description is read in conjunction with the accompanying drawings, wherein:

FIG. 3 is a block diagram illustrative of a second embodiment of the non-geostationary satellite according to the present invention.

DETAILED DESCRIPTION OF THE PREFERRED EMBODIMENTS

Some embodiments of the present invention will now be explained with reference to the drawings.

Figure 1:
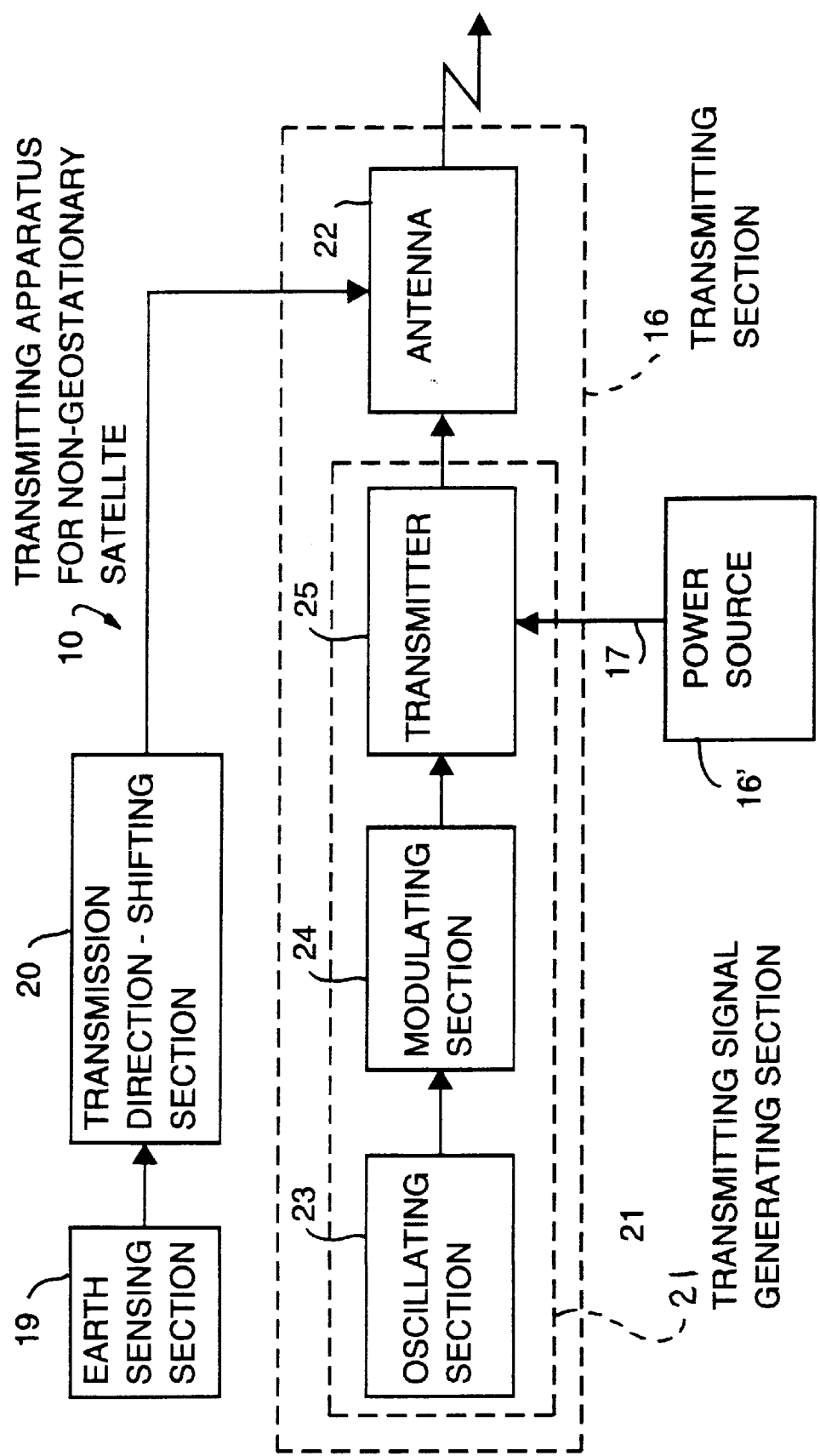
FIG. 1 is a block diagram illustrative of a first embodiment of the non-geostationary satellite according to the present invention.

Referring to FIG. 1, a transmitting apparatus 10 for non-geostationary satellites according to a first embodiment of the present invention is mounted in a non-geostationary satellite of a satellite communications system which carries out intersatellite communication between a geostationary satellite and the non-geostationary satellite.

Figure 2:
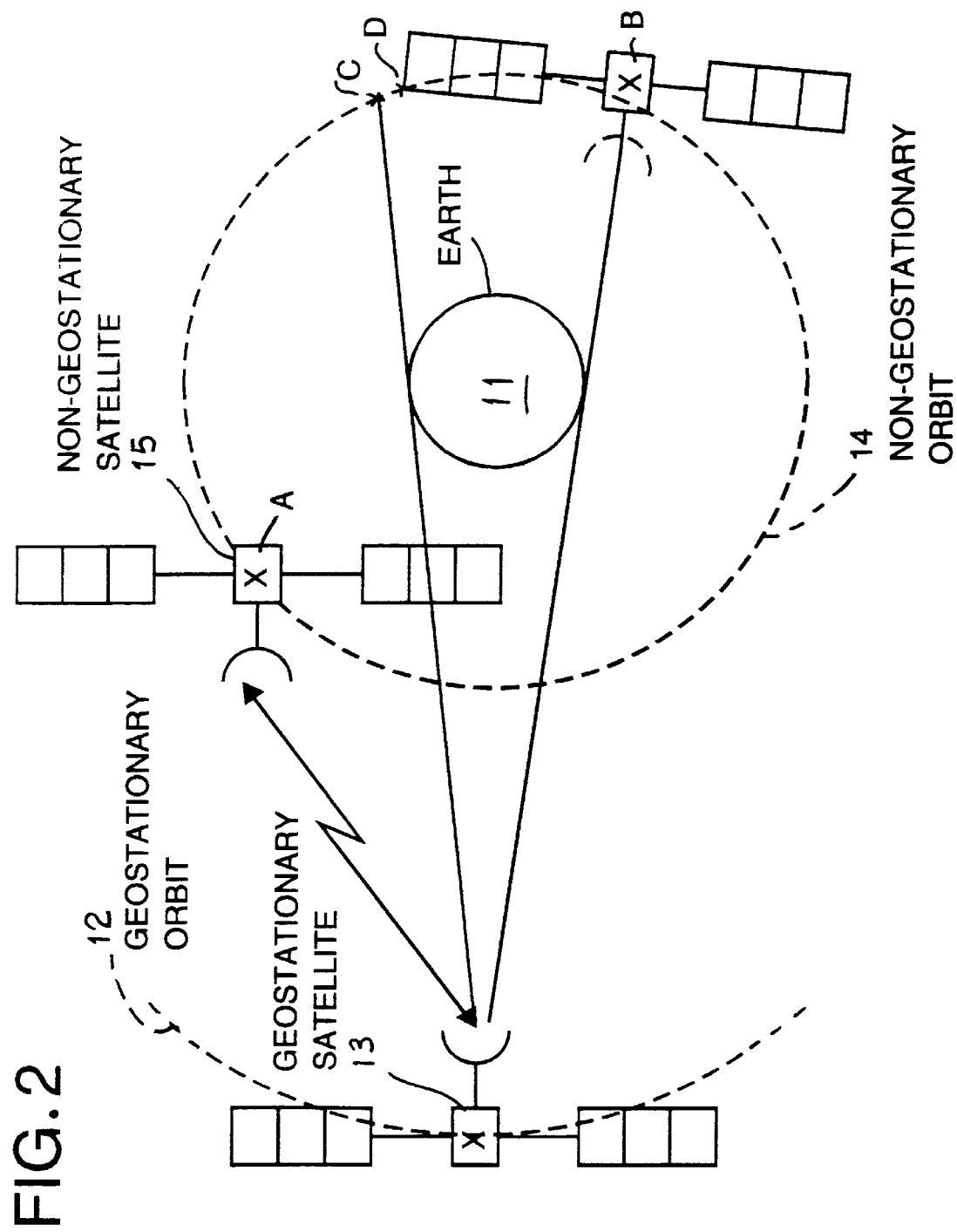
FIG. 2 is a view illustrative of a satellite communications system which includes a non-geostationary satellite in which a transmitting apparatus for non-geostationary satellites according to the present invention is mounted.

Referring to FIG. 2, the intersatellite communication according to the satellite communications system is basically carried out between a geostationary satellite 13 revolving around the Earth 11 along a geostationary orbit 12 separated from the surface of the Earth 11 by a first given distance in a stationary state relative to the surface of the Earth 11, and a non-geostationary satellite (revolving satellite) 15 revolving around the Earth 11 along a non-geostationary orbit (revolving orbit) 14 separated from the surface of the Earth 11 by a second given distance smaller than the first given distance in a non-stationary state relative to the surface of the Earth 11. In addition, the geostationary satellite 13 communicates with a station on the Earth 11 in some cases; this communication makes it possible to communicate between the non-geostationary satellite 15 and the station on the Earth 11 via the geostationary satellite 13.

In cases where the Earth 11 is outside the path between the non-geostationary satellite 15 and the geostationary satellite 13, for example, at position A as illustrated, there is no risk of the transmitting output from the non-geostationary satellite 15 impinging on the Earth 11. However, as the Earth 11 approaches the path between the non-geostationary satellite 15 and the geostationary satellite 13, for example, at position B as illustrated, the transmitting output from the non-geostationary satellite 15 impinges on the surface of the Earth 11, thus failing to comply with the restricting conditions for the PFD prescribed by the Radio Law. For this reason, the transmitting apparatus 10 for non-geostationary satellites as illustrated in FIG. 1 is mounted in the non-geostationary satellite 15.

In FIG. 1 and FIG. 2, the transmitting apparatus 10 for non-geostationary satellites is equipped with a transmitting section 16. This transmitting section 16 is supplied with power 17 from a power source 16' and sends a transmitting signal to the geostationary satellite 13 along the path between the non-geostationary satellite 15 and the geostationary satellite 13.

An Earth-sensing section 19 detects the presence of the Earth 11 crossing the direction of transmission of a signal by the transmitting section 16 (in other words, the movement of the non-geostationary satellite 15 from position B to position C through position D) and outputs a detection signal as long as the Earth 11 crosses the direction of transmission of the transmitting signal. A transmission direction-shifting section 20 is connected to the transmitting section 16 and the Earth-sensing section 19 and shifts the direction of transmission of the signal from the transmitting section 16 to an Earth-bypassing direction.

More specifically, the transmitting section 16 comprises a transmitting signal-generating section 21 and an antenna 22 which is connected to the transmitting signal-generating section 21 and sends a transmitting signal generated by the transmitting signal-generating section 21 to the geostationary satellite 13 along the path between the non-geostationary satellite 15 and the geostationary satellite 13. The transmitting signal-generating section 21 comprises an oscillating section 23 which generates an oscillating signal, a modulating section 24 for modulating the oscillating signal to a modulated signal and a transmitter 25 which sends the modulated signal as a transmitting signal while it is supplied with the power 17 from the power source 16'.

The transmission detection-shifting section 20 is connected to the Earth-sensing section 19 and the antenna 22 and is designed to shift the direction of transmission of the transmitting signal from the antenna 22 to an Earth-bypassing direction.

The operation of the non-geostationary satellite 10 illustrated in FIG. 1 will now be explained with reference to FIG. 2 as well.

The Earth-sensing section 19 with a field of view (FOV) biased by $\alpha$ with respect to the direction of the main axis of the antenna is designed to detect the Earth 11. $\alpha$ is usually set to be on the order of 5 degrees, with a margin to prevent irradiation on the Earth. The Earth-sensing section 19 may be composed of an infrared sensor which is designed to detect the Earth 11 based on the detection of infrared radiation from the air enveloping the Earth 11, a microwave laser, etc. Such infrared sensor is described in the article "Research and development of precision earth sensor "SPIE Vol. 1157 Infrared Technology XV (1989) and in the section "Description of the Prior Art" in Japanese Unexamined Patent Application Disclosure SHO 60-71399 (1985), for example. The transmission direction-shifting section 20 operates in response to a detection signal outputted by the Earth-sensing section 19. With this operation, the antenna 22 is directed along an Earth-bypassing direction as defined above only during the movement of the non-geostationary satellite 15 from position B to position C, as illustrated in FIG. 2, during which the PFD may be increased over the limit prescribed by the Radio Law, thereby allowing compliance with the restrictions placed on the PFD.

Referring to FIG. 3, the transmitting apparatus 30 for non-geostationary satellites according to a second embodiment of the present invention is the same as the transmitting apparatus 10 for non-geostationary satellites which is illustrated in FIG. 1, except that a power supply-suspending section 31 is provided instead of the transmission direction-shifting section 20. This power supply-suspending section 31 is connected to the transmitting section 25 and the Earth-sensing section 19 and is designed to automatically suspend the supply of the power 17 to the transmitter 25 of the transmitting section 16 from the power source 16' thereby stopping transmission of the transmitting signal from the transmitter 25 of the transmitting section 16. With this design, transmission of the transmitting signal from the transmitting section 16 may be automatically stopped only during movement of the non-geostationary satellite 15 from position B to position C, as illustrated in FIG. 2, during which the prescribed PFD may be violated, thus allowing compliance with the restrictions placed on the PFD.

As described above, the present invention provides a transmitting apparatus for use in non-geostationary satellites which allows compliance with the restrictions placed on PFD even in when the Earth is located between the geostationary satellite and the non-geostationary satellite.

What is claimed is:

1. A transmitting apparatus for use in non-geostationary satellites which is mounted in a non-geostationary satellite of a satellite communications system to carry out intersatellite communication between a geostationary satellite revolving around the Earth along a geostationary orbit separated from the surface of the Earth by a first given distance in a stationary state relative to the surface of the Earth, and said non-geostationary satellite revolving around the Earth along a non-geostationary orbit separated from the surface of the Earth by a second given distance smaller than said first given distance in a non-stationary state relative to the surface of the Earth, and which is equipped with transmitting means which sends a transmitting signal to said geostationary satellite along the path between said non-geostationary satellite and said geostationary satellite, comprising:

Earth-sensing means for detecting the presence of the Earth in the direction of transmission of said transmitting signal by said transmitting means to output a detection signal as long as the Earth crosses the direction of transmission of said transmitting signal; and transmission direction-shifting means which is connected to said transmitting means and said Earth-sensing means and is designed to shift the direction of transmission of said transmitting signal by said transmitting means to a direction which prevents the Earth from being exposed to said transmitting signal as long as said transmission direction-shifting means is receiving said detection signal.

2. A transmitting apparatus as claimed in claim 1, wherein said transmitting means comprises a transmitting signal-generating section which generates said transmitting signal and an antenna which is connected to said transmitting signal-generating section to send said transmitting signal to said geostationary satellite along said path between said non-geostationary satellite and said geostationary satellite, and said transmission direction-shifting means is connected to said Earth-sensing means and said antenna and is designed to shift the direction of transmission of said transmitting signal by said transmitting means to said direction which prevents the Earth from being exposed to said transmitting signal as long as said transmission direction-shifting means is receiving said detection signal.

3. A transmitting apparatus for use in non-geostationary satellites which is mounted in a non-geostationary satellite of a satellite communications system to carry out intersatellite communication between a geostationary satellite revolving around the Earth along a geostationary orbit separated from the surface of the Earth by a first given distance in a stationary state relative to the surface of the Earth, and said non-geostationary satellite revolving around the Earth along a non-geostationary orbit separated from the surface of the Earth by a second given distance smaller than said first given distance in a non-stationary state relative to the surface of the Earth, and which is supplied with power and is equipped with transmitting means which sends a transmitting signal to said geostationary satellite along the path between said non-geostationary satellite and said geostationary satellite, comprising:

Earth-sensing means for detecting the presence of the Earth in the direction of transmission of said transmitting signal by said transmitting means to output a detection signal as long as the earth crosses the direction of transmission of said transmitting signal; and transmitting power decreasing means responsive to detection of said Earth-sensing means for decreasing an output of said transmitting means.

4. A satellite communication system constructed between two satellites each having transmitting means and an antenna, one of said satellites further comprising:

Earth-sensing means for detecting the presence of the Earth in a signal transmission direction; and transmitting power decreasing means for decreasing an output of said transmitting means in response to detection of said Earth-sensing means, said output being directionally transmitted to the Earth.

5. A satellite communication system as recited in claim 4, further including a transmission direction-shifting means coupled to the Earth sensing means, and coupled to said antenna, said transmission direction-shifting means shifting a direction of said antenna.

6. A satellite communication system as claimed in claim 4, wherein said two satellites are a geostationary satellite and non-geostationary satellite, respectively.

7. A satellite communication system as claimed in claim 6, said Earth-sensing means and transmitting power decreasing means are disposed in said non-geostationary satellite.

8. A satellite communication system as claimed in claim 4, wherein said transmitting power decreasing means decreases power supply to be applied to said transmitting means.

* * * * *